United States Patent
Jacobs et al.

(10) Patent No.: US 8,529,755 B1
(45) Date of Patent: Sep. 10, 2013

(54) OIL SOLUBLE ADDITIVE INJECTION APPARATUS

(71) Applicant: Puradyn Filter Technologies Inc., Boynton Beach, FL (US)

(72) Inventors: William A. Jacobs, Lake Worth, FL (US); Brian A. Jacobs, Lake Worth, FL (US); Neil Graham, Fort Lauderdale, FL (US); Allen D. Hertz, Boca Raton, FL (US)

(*) Notice: Subject to any disclaimer, the term of this patent is extended or adjusted under 35 U.S.C. 154(b) by 0 days.

(21) Appl. No.: 13/676,046

(22) Filed: Nov. 13, 2012

Related U.S. Application Data

(63) Continuation-in-part of application No. 12/796,652, filed on Jun. 8, 2010, now Pat. No. 8,308,941.

(51) Int. Cl.
*F16N 25/02* (2006.01)

(52) U.S. Cl.
USPC .......... 210/91; 210/205; 222/49; 222/94; 222/95; 222/136; 222/137

(58) Field of Classification Search
USPC .......... 210/205, 206, 91; 137/268, 564.5; 222/136, 137, 47, 49, 94, 95, 203, 196
See application file for complete search history.

(56) References Cited

U.S. PATENT DOCUMENTS

| | | | | |
|---|---|---|---|---|
| 4,195,711 A | * | 4/1980 | Bartlett | 184/55.2 |
| 5,012,897 A | * | 5/1991 | Jorissen | 184/39 |
| 5,435,346 A | * | 7/1995 | Tregidgo et al. | 137/564.5 |
| 7,931,817 B2 | * | 4/2011 | Bilski | 210/767 |
| 2009/0038888 A1 | * | 2/2009 | Eisenbacher | 184/39 |

FOREIGN PATENT DOCUMENTS

EP 253647 A * 1/1988

* cited by examiner

*Primary Examiner* — Terry Cecil
(74) *Attorney, Agent, or Firm* — Allen D. Hertz, P.A.; Allen D. Hertz

(57) ABSTRACT

A lubricant additive dispensing apparatus comprising a base providing a manifold distribution to present lubricant to a series of dispensing chambers. The dispensing chambers are fabricated having a porous sidewall formed in a tubular shape. Additive is stored within a reservoir formed by the tubular shape. A delivery piston is provided proximate and in fluid communication with the manifold. The lubricant applies pressure to the delivery piston. The delivery piston applies pressure to the stored additive. The pressure forces a small volume of additive to pass through the porous sidewall, blending the additive with the flowing lubricant. The reservoir can be formed between an outer tubular member and an inner tubular member. Lubricant can pass through an interior of the inner tubular member, exiting a flow discharge port located proximate an end cap assembled to a distal end of the reservoir.

14 Claims, 13 Drawing Sheets

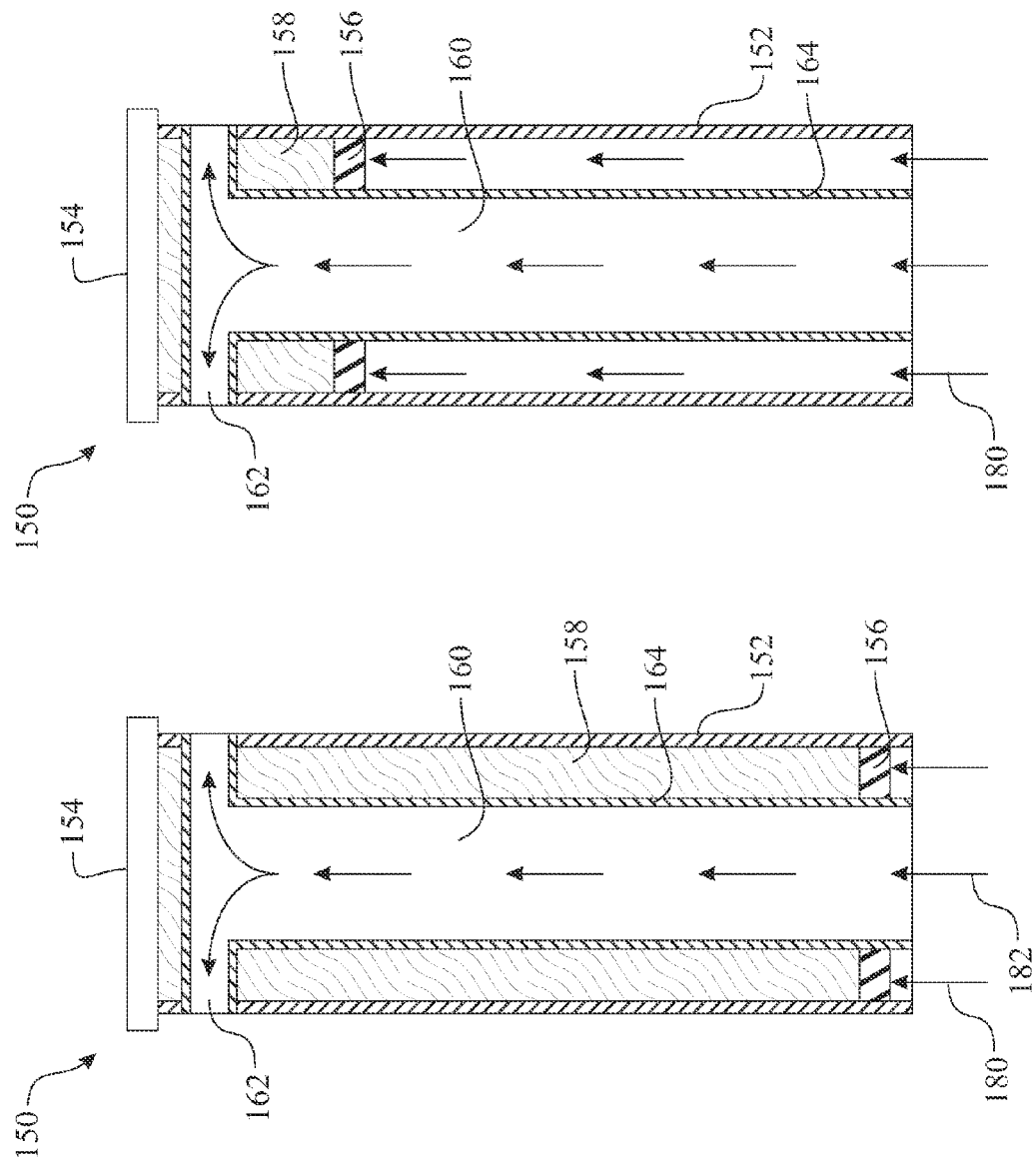

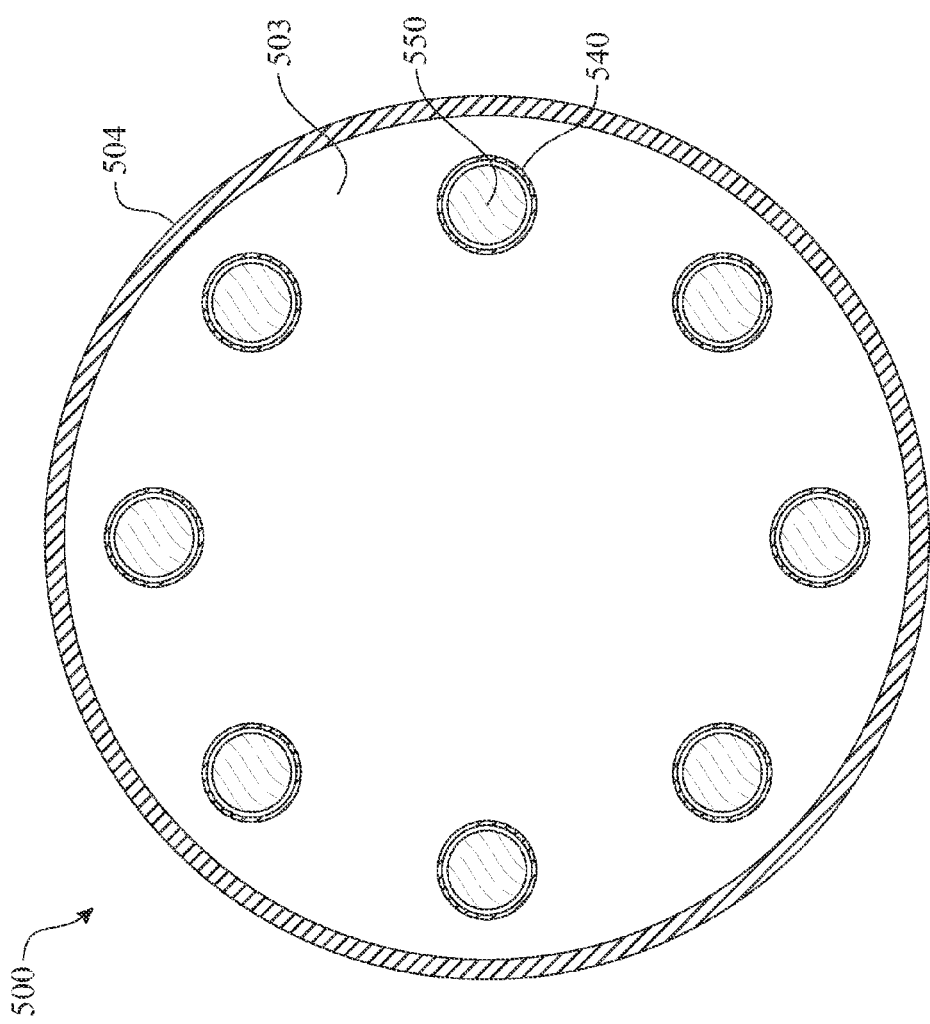

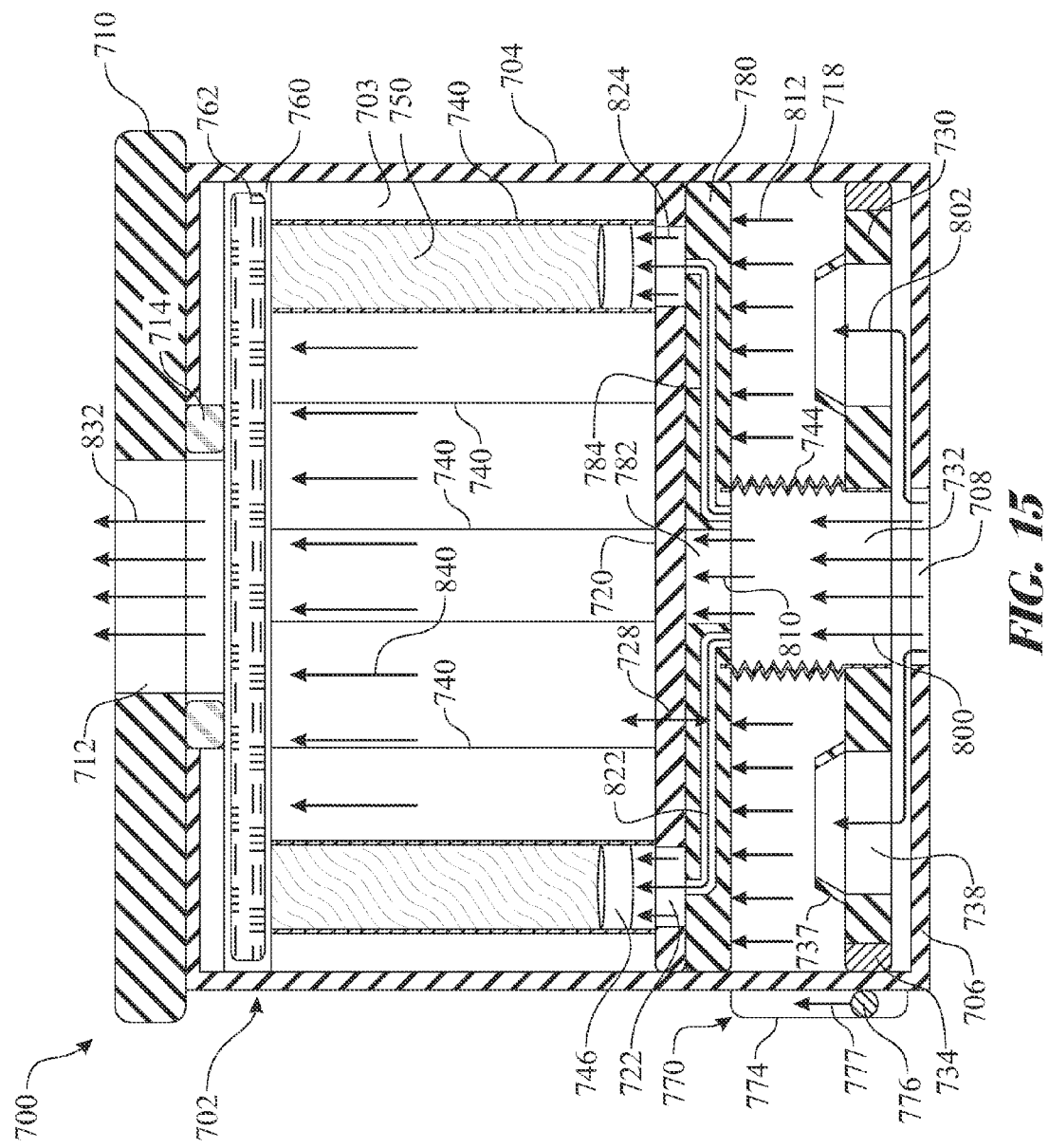

OIL SOLUBLE ADDITIVE INJECTION APPARATUS

CROSS-REFERENCE TO RELATED APPLICATION

This Non-Provisional Utility Patent Application is a Continuation-In-Part Application, which claims the benefit of United States Non-Provisional patent application Ser. No. 12/796,652, filed on Jun. 8, 2010 (issuing as U.S. Pat. No. 8,308,941 on Nov. 13, 2012), which is incorporated herein in its entirety.

FIELD OF THE INVENTION

The present invention relates to an oil additive injection device and method and more specifically to an oil additive injection device having a series of tubular dispensing members utilizing compression to force the additive through partially-permeable membrane sidewalls of the dispensing members.

BACKGROUND OF THE INVENTION

Discussion of the Related Art

Equipment having moving parts, such as pistons, gears, and the like, utilize lubricants to increase the longevity and reliability of the equipment. Examples of equipment utilizing lubricants include internal combustion engines, hydraulic equipment, transmissions, differential gears, and the like. The lubricant is degraded by oxidation and sulfur acidification, adversely affecting equipment operation over time. For that reason, it is known to introduce additives, such as anti-oxidants, in order to extend the time between oil filter changes and/or adequately protect the equipment.

One such method of introducing the additive is to contain pellets encapsulating the additive within a dispenser. As an outer shell of the pellets dissolve, the additive is released into the lubricant. The pellets are rice-shaped, having a thickness of about 0.0625-0.125 inches and a length of about 0.3-0.7 inches, and comprises about 83-90% ethylene propylene polypropylene with a specific gravity of about 0.9 and a Shore D hardness of about 70, and about 10-17% additives comprising a combination of dispersing agent, lubricant, and detergent neutralizer. The polypropylene dissolves in above-ambient temperature oil to release the additives therefrom.

A second such method entraps the additive within a fibrous material. The fibrous material is encapsulated within a container. The lubricant passes through the fibrous material within the container. The additive is introduced to the lubricant as the fibrous material dissolves. Alternately, the pellets above are entrapped within the fibrous material, releasing the additive as the outer shell of the pellets dissolve.

A reoccurring issue plaguing the industry is the build up of sludge. The sludge congregates in nooks and crannies of the lubrication system. The filter and additive devices are prone to sludge buildup by nature of the device. The device has a high occurrence of corners and other surfaces that attract sludge. Another issue is flow resistance resulting from impingement created by the features within the filter and additive devices.

It is the primary object of the present invention to provide for the effective construction of an oil reclamation device that neutralizes sulfur acidification and oxidation. This and other objects of the invention will become clear from an inspection of a detailed description of the invention, and from the appended claims.

SUMMARY OF THE INVENTION

The present invention is directed to a lubricant additive injection system comprising a plurality of tubular additive injectors.

In a first aspect of the present invention, a lubricant additive injection system comprising:

a dispenser base assembly having a series of dispensing chamber ports therethrough;

a series of lubricant additive injectors assembled to the dispenser base assembly, each lubricant additive injector aligned to and in fluid communication with a respective dispensing chamber port, each lubricant additive injector having:

an outer tubular structure comprising a partially permeable membrane outer sidewall, an inner tubular structure comprising a vertical sidewall, the inner tubular structure located within a hollow region formed by the outer tubular structure, an additive cavity formed in the space created between the outer tubular structure and the inner tubular structure, and a delivery piston forming a seal across the additive cavity, the piston being on a plane that is oriented generally perpendicular to the additive cavity; and additive stored within the additive cavity;

wherein the delivery piston is positioned to transfer pressure from flowing lubricant to the stored additive, compressing the additive causing the additive to be dispensed through the partially permeable membrane outer sidewall.

While another aspect of the present invention provides at least one flow discharge port located through the outer tubular structure proximate a distal end.

In another aspect, the series of lubricant additive injectors are spatially positioned forming a circular pattern about the base assembly.

In another aspect, the series of lubricant additive injectors are spatially positioned forming a spiral pattern about the base assembly.

Another aspect integrates a lubricant distribution manifold within the dispenser base assembly.

In another aspect of the present invention, a central plug is inserted through a central plug aperture within the base assembly.

In another aspect, the lubricant additive injection system further comprising a cylindrical dispensing chamber having a porous outer sidewall, the chamber being filled with additive and a delivery piston providing a seal between the lubricant and the additive.

In another aspect, the porous material is micro-porous polymer membrane.

In another embodiment of the present invention, a lubricant additive injection system comprising:

a fluid processing housing having a supply base member, a tubular housing sidewall extending axially from a peripheral edge of the supply base member, and a housing cover sealing an exposed end of the tubular housing sidewall, the fluid processing housing defining an interior volume;

a fluid processing housing supply orifice passing through the fluid processing housing;

a fluid processing housing return orifice passing through the fluid processing housing;

an additive compression piston slideably assembled within the interior volume of the fluid processing housing, the additive compression piston defining a fluid processing side and a supply side;

a series of additive injecting chambers extending from the additive compression piston fluid processing side towards a housing cover;

a fluid enhancing additive contained within each of the series of additive injecting chambers;

a vibration inducing pressurized chamber having one side defined by the additive compression piston supply side; and a fluid pathway between the fluid processing housing supply orifice, wherein the fluid pathway directs fluid to apply a pressure against the additive compression piston supply side resulting in a compressive force applied by the additive compression piston fluid processing side upon each of the series of additive injecting chambers to inject a volume of the fluid enhancing additive into a fluid.

In another aspect, the additive compression piston is fabricated of a porous material.

In another aspect, the fluid reclamation processing assembly further comprises a filtration polymer pad located along a fluid flow path routed between the series of additive injecting chambers and the fluid processing housing return orifice.

In another aspect, the additive compression piston further comprises a molded polymer wrap extending about a peripheral edge thereof.

In another aspect, the fluid reclamation processing assembly further comprises:

an additive compression piston indicator comprising:

an indicator chamber having at least a clear segment extending along a longitudinal axis assembled to an exterior surface of the fluid processing housing;

a piston position indicator moveably retained within the indicator chamber; and an indicator feature assembled to the additive compression piston at a location proximate the indicator chamber, wherein the piston position indicator and the indicator feature are magnetically attracted to one another such that the piston position indicator moves within the indicator chamber in conjunction with movement of the additive compression piston.

These and other features, aspects, and advantages of the invention will be further understood and appreciated by those skilled in the art by reference to the following written specification, claims and appended drawings, which follow.

BRIEF DESCRIPTION OF THE DRAWINGS

For a fuller understanding of the nature of the present invention, reference should be made to the accompanying drawings in which:

FIG. 7 presents a sectioned side view of the tubular dispensing chamber, the section taken along section 7-7 of FIG. 5, illustrated in a filled configuration;

FIG. 8 presents a sectioned side view of the tubular dispensing chamber, the section taken along section 7-7 of FIG. 5, illustrated in a partially consumed configuration;

FIG. 14 presents a sectioned top view of the fluid reclamation processing assembly originally introduced in FIG. 12, the section illustrating a layout of a series of additive injecting chambers; and FIG. 15 presents a sectioned side view of an alternative exemplary fluid reclamation processing assembly introducing a second vibration generating system.

Like reference numerals refer to like parts throughout the several views of the drawings.

DETAILED DESCRIPTION OF REPRESENTATIVE EMBODIMENTS

Figure 1:
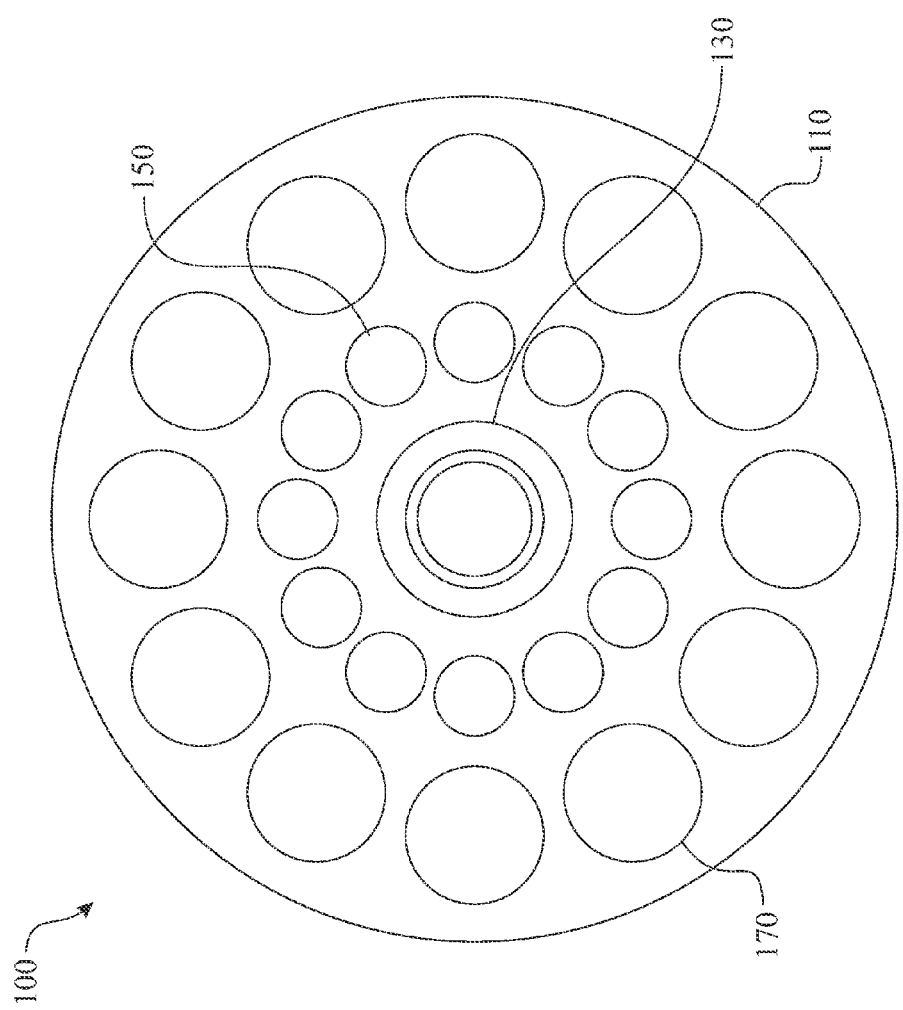
FIG. 1 presents a top plan view of an exemplary multi-chambered additive dispenser illustrating a first layout.
Figure 2:
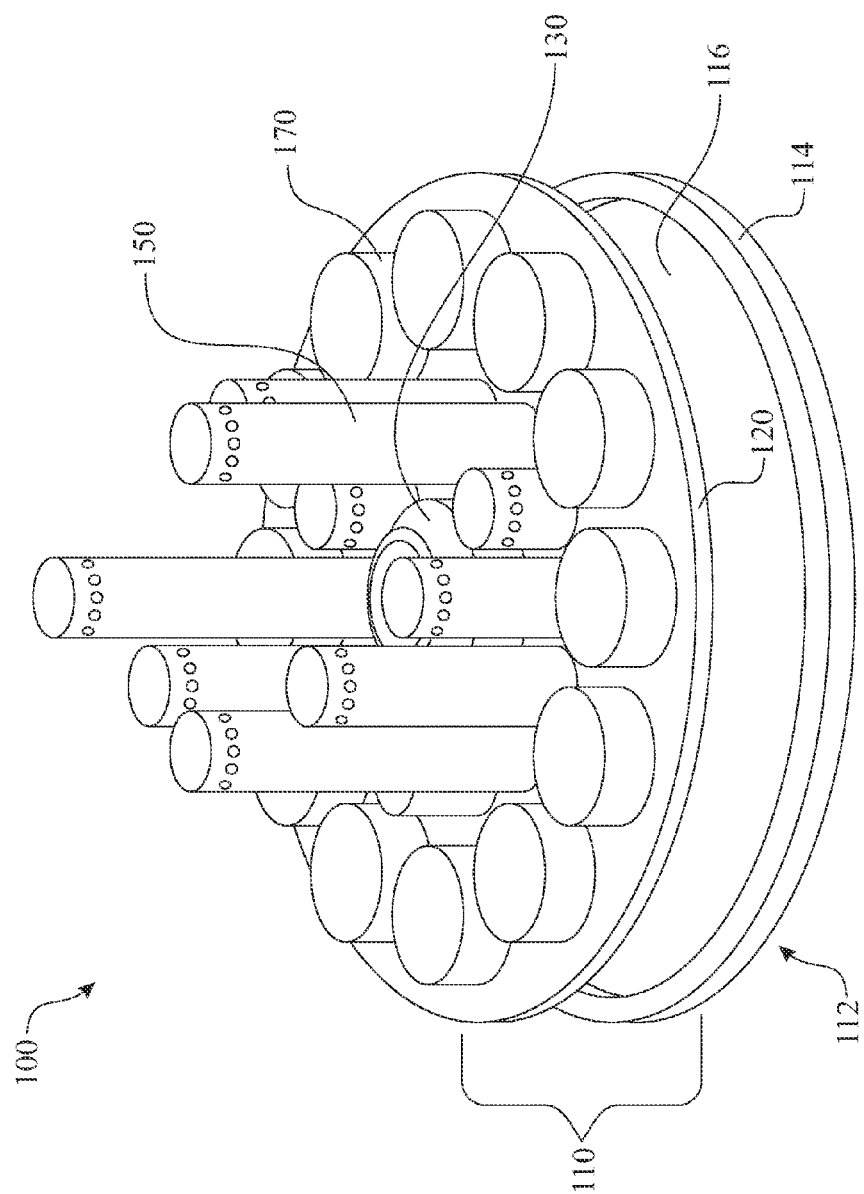
FIG. 2 presents a partially exploded isometric view of the exemplary multi-chambered additive dispenser of FIG. 1.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 3:
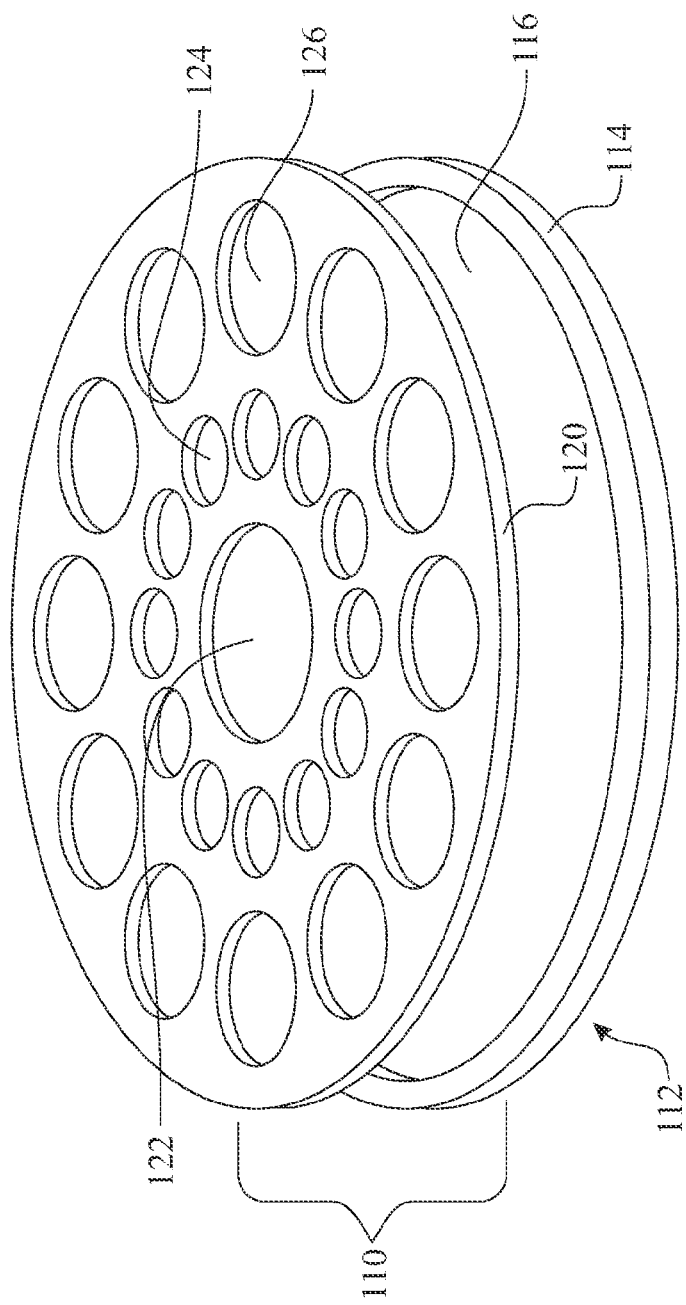
FIG. 3 presents an exploded isometric view of a dispenser base assembly providing a manifold for distributing lubricant to each of a series of dispensing elements.
Figure 4:
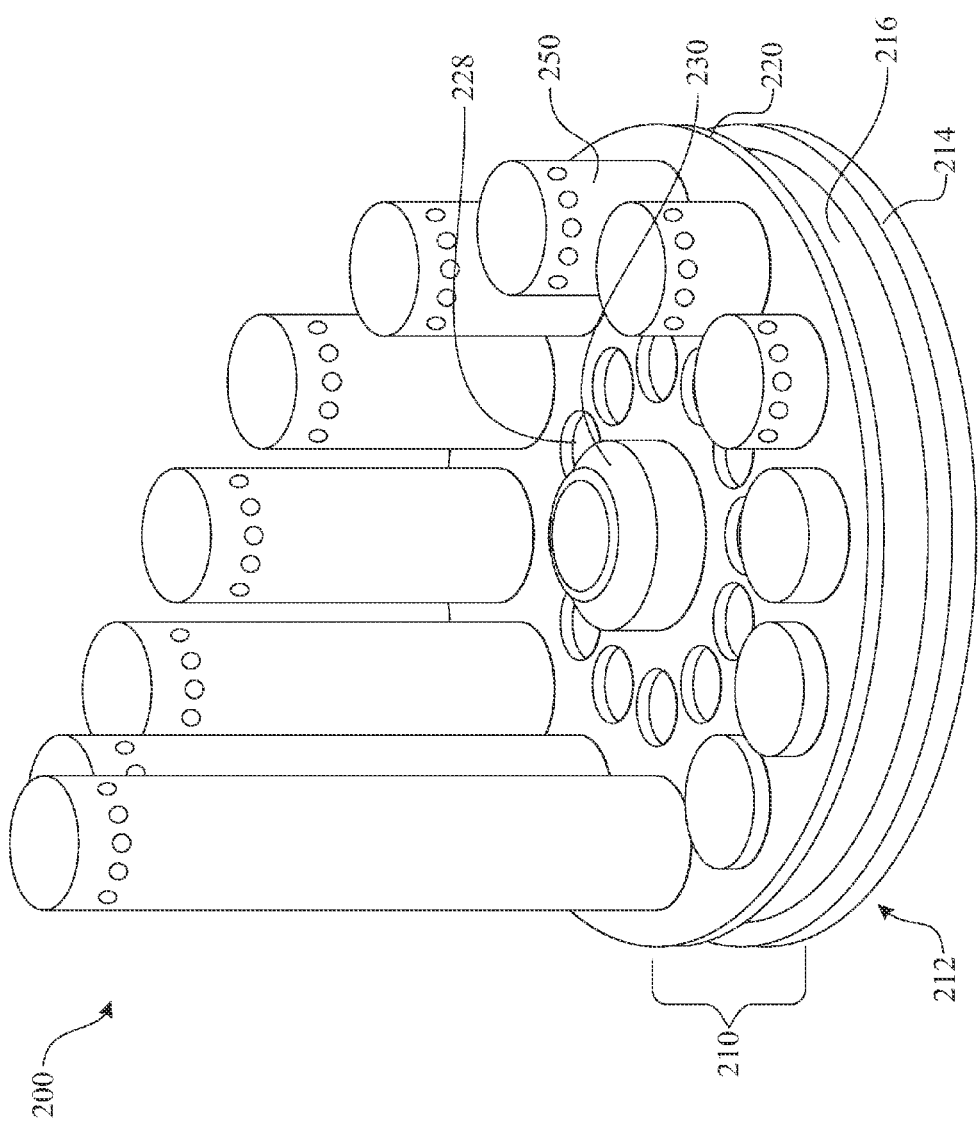
FIG. 4 presents a partially exploded isometric view of a second exemplary multi-chambered additive dispenser.
Figure 6:
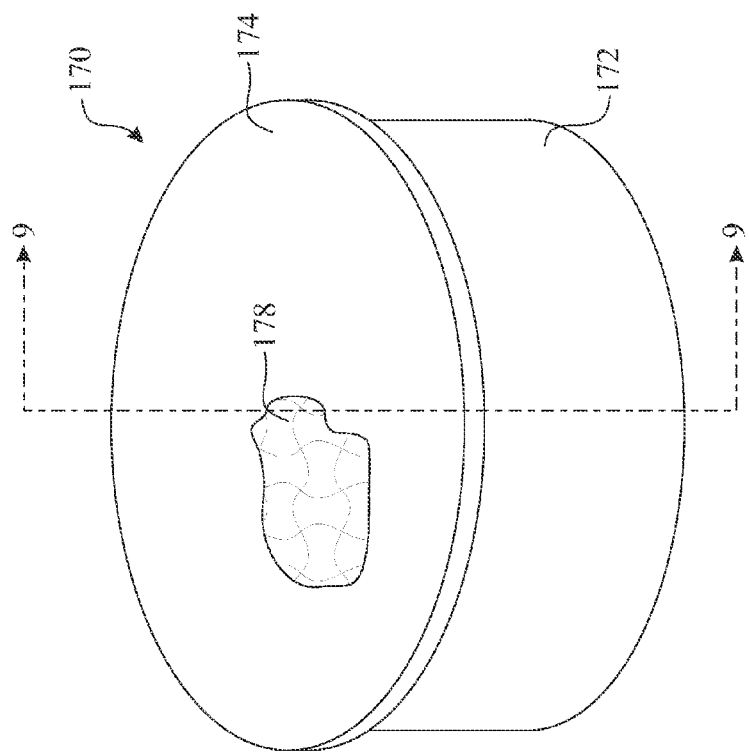
FIG. 6 presents an isometric view detailing an exemplary solid dispensing chamber.
Figure 5:
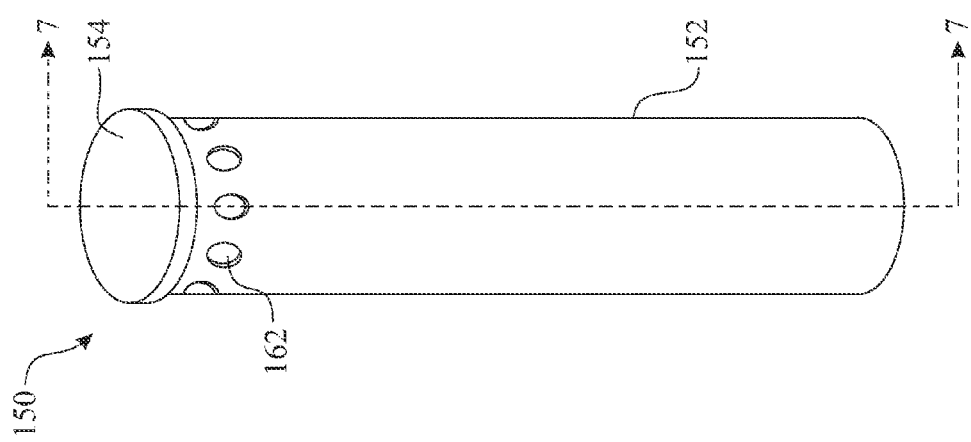
FIG. 5 presents an isometric view detailing an exemplary tubular dispensing chamber.
Figure 9:
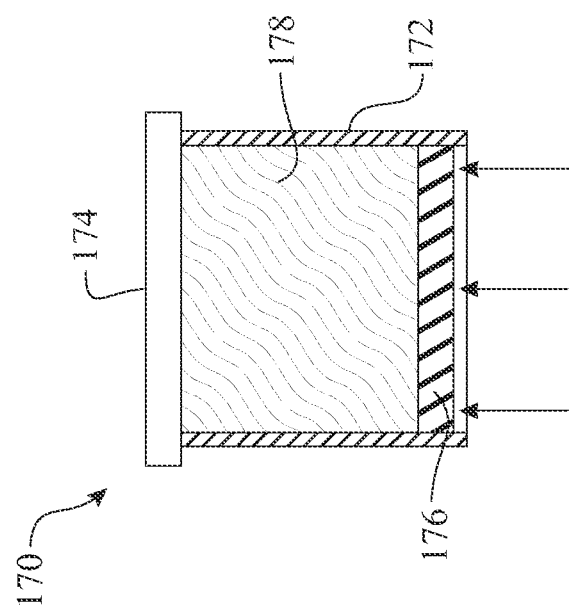
FIG. 9 presents a sectioned side view of the solid dispensing chamber, the section taken along section 9-9 of FIG. 6, illustrated in a filled configuration.

A multi-chambered additive dispenser 100 dispenses additive into a lubricant, the multi-chambered additive dispenser 100 being described in FIGS. 1 through 4, with details of the dispensing members being described in FIGS. 5 through 9. Lubricant enters a dispenser base assembly 110, which distributes the lubricant to a series of apertures provided therethrough. The dispenser base assembly 110 includes a hollow center referred to as a base manifold 116. The base manifold 116 is defined by a base peripheral wall 114 fabricated between a base of a base lower member 112 and a base upper member 120. The lubricant enters the base manifold 116 and passed into the series of dispensing chambers via a series of hollow dispensing chamber port 124 and/or solid dispensing chamber port 126. The ports 124, 126 can be provided in any arrangement, including circular arrays as illustrated in FIG. 3, spiraling, rectangular, random, and the like. A central plug aperture 122 can be provided through the base upper member 120 as an override as needed, wherein the central plug aperture 122 is preferably centrally located. The base lower member 112 can include a threaded (or other) attachment interface for engagement with a lubricant servicing system. The attachment interface provides mechanical coupling and fluid communication between the lubricant servicing system and the multi-chambered additive dispenser 100. The base upper member 120 can be planar as illustrated or of any shaped surface.

A series of additive delivery dispensers 150, 170 are assembled to the base upper member 120, each additive delivery dispenser 150, 170 is positioned respective to a port 124, 126. The additive delivery dispensers 150, 170 can be of similar heights, such as the solid dispensing chamber 170 illustrated in FIG. 2 or of a variety of heights such as the tubular dispensing chamber 150 illustrated in FIG. 2.

A central plug 130 is removably inserted into the central plug aperture 122 providing a seal. The central plug 130 can be removed to divert the lubricant from pressure against the series of additive delivery dispensers 150, 170. The central plug 130 can be of any reasonable design for sealing a port. It is understood that the central plug 130 can be a single unit or a provided as a plurality of plugs 130 and they can be positioned as desired.

The additive is stored within the series of additive delivery dispensers 150, 170, as illustrated in FIGS. 5 through 9. The additive delivery dispensers can be provided in a variety of configuration, such as a tubular dispensing chamber 150 and the solid dispensing chamber 170, based upon the designated application. The tubular dispensing chamber 150 is fabricated forming two sections: a reservoir for storing additive 158 and a passageway for conveyance of the lubricant. The reservoir is created by a porous sidewall 152 forming an external surface of the tubular dispensing chamber 150. The porous sidewall 152 is formed into a tubular shape, creating a hollow interior. A second, inner flow sidewall 164 is assembled within the hollow interior formed by the porous sidewall 152. The inner flow sidewall 164 can be porous or non-porous. The additive 158 is stored in a volume formed between the interior surface of the porous sidewall 152 and the exterior surface of the inner flow sidewall 164. The top of the volume may be sealed using either a porous or an impermeable cap. A delivery piston 156 is moveably provided along a lower portion of the reservoir holding the additive 158. The molecular structure of the additive 158 is such to remain contained within the reservoir until pressure is applied. The porous material is preferably of a micro-porous polymer, having a porosity that maintains the additive 158 therein until a pressure is applied. The applied pressure forces small amounts of the additive 158 through the porous material. The additive 158 then blends into the lubricant surrounding the tubular dispensing chamber 150. Where the inner flow sidewall 164 is also porous, the additive 158 also blends into the lubricant within the lubricant passage 160.

The tubular dispensing chamber 150 apportions the lubricant between a dispensing portion and a pass through portion. The dispensing portion applies a dispensing force 180 to a delivery piston 156. Applied pressure forces the additive 158 through the porous sidewall 152 in a small, controlled volume. The portion of the lubricant contacting the delivery piston 156 applies a pressure to the additive 158. The delivery piston 156 adjusts upwardly as the additive 158 is dispensed into the lubricant until the delivery piston 156 is seated against a distal end of the reservoir. The dispensed additive 158 blends into the lubricant. Upon depletion of the additive 158, the spent tubular dispensing chamber 150 can be removed and replaced with a new tubular dispensing chamber 150. The balance of the lubricant passes through a lubricant passage 160 formed within an interior of the inner flow sidewall 164, exiting through a flow discharge port 162 referenced as a pass through flow 182 illustrated in FIGS. 7 and 8. The designer can incorporate any reasonable flow control path for returning the lubricant back into the system, such as the exemplary embodiments illustrated in FIGS. 10 and 11. A directive end cap 154 provides an upper end of the tubular dispensing chamber 150. The tubular dispensing chamber 150 can be porous or impermeable. The flow discharge port 162 can be provided in any of a variety of form factors including a series of ports spatially arranged about the circumference of the porous sidewall 152. The tubular dispensing chamber 150 provides a flow path that minimizes any impact of sludge buildup within the multi-chambered additive dispenser 100. The continuous flow of lubricant and small cross sectional area of the delivery piston 156 minimizes any potential for collection of sludge.

Alternately, a solid dispensing chamber 170 can be utilised. The solid dispensing chamber 170 is similar to the tubular dispensing chamber 150, void of a lubricant passage 160. The solid dispensing chamber 170 is formed having a porous sidewall 172 creating a reservoir for containment and dispensing of additive 178. A directive end cap 174 is disposed upon a distal end of the porous sidewall 172 provide a distal seal for the solid dispensing chamber 170. Similar to the tubular dispensing chamber 150, the lubricant applies a pressure to the delivery piston 176, forcing the additive 178 through the porous sidewall 172 in a controlled volume. The dispensed additive 178 blends into the lubricant.

The multi-chambered additive dispenser can arrange the dispensing chambers in a variety of configurations. The multi-chambered additive dispenser 100 of FIGS. 1 and 2 include a series of solid dispensing chambers 170 spatially arranged in a circular configuration. A series of tubular dispensing chambers 150 are spatially arranged in a circular configuration within the center of the circular boundary created by the series of solid dispensing chambers 170. The lubricant passes through the lubricant passage 160 to minimize flow loss. The solid dispensing chambers 170 are provided at a variety of heights to aid in fluid flow and overcome any sludge build up on a downstream flow side of the multi-chambered additive dispenser 100. The different heights also aid in mixing the additive 158 into the lubricant by dispensing the additive 158 at different levels.

It is understood that the additive delivery dispensers 150, 170 can be arranged in any relationship. A second exemplary embodiment is referred to as a spiraling multi-chambered additive dispenser 200 and illustrated in FIG. 4. Lubricant enters a dispenser base assembly 210, which distributes the lubricant to a series of apertures provided therethrough. The dispenser base assembly 210 includes a hollow center referred to as a base manifold 216. The base manifold 216 is defined by a base peripheral wall 214 fabricated between a base of a base lower member 212 and a base upper member 220. The lubricant enters the base manifold 216 and passed into the series of dispensing chambers via a series of ports similar to the solid dispensing chamber port 126. A series of dispensing chambers 250 are provided in a circular pattern having a spiraling height as illustrated. It is understood the dispensing chambers 250 can be arranged in a horizontal spiraling pattern as well. A series of lubricant passage port 228 are provided through the base upper member 220, allowing lubricant to pass through base upper member 220 and return to the lubrication system. A central plug 230 can be provided, wherein the central plug 230 can be adjustable for adjustably controlling the free flow of the lubricant through the spiraling multi-chambered additive dispenser 200.

The multi-chambered additive dispenser 100 can be encased within a housing, similar to an oil filter or inserted into a conduit used for the passage of lubricant. The multi-chambered additive dispenser 100 can be combined with a lubricant filter via any reasonable means such as either of the exemplary embodiments presented in FIGS. 10 and 11.

Figure 10:
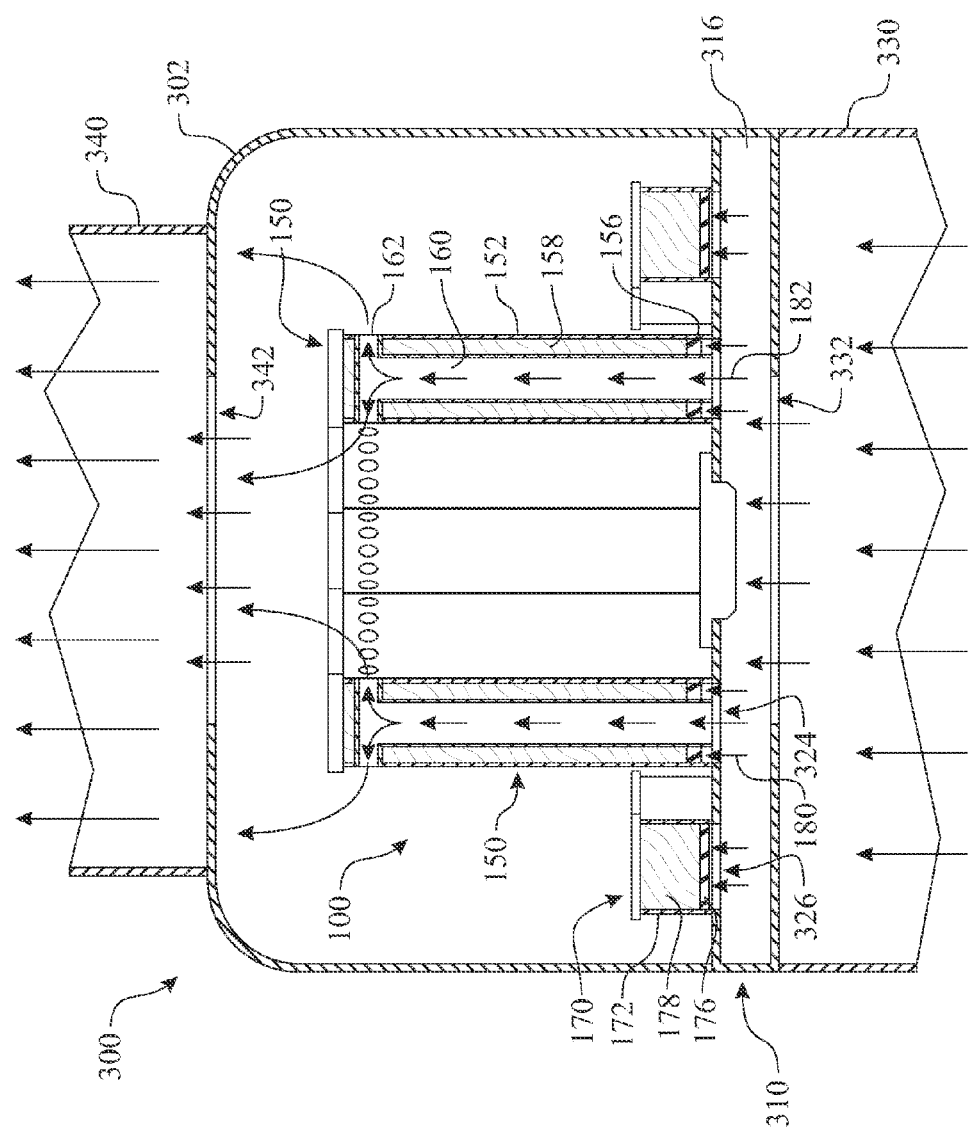
FIG. 10 presents a sectioned side view of the multi-chambered additive dispenser encased within a linear pass through delivery apparatus.

The multi-chambered additive dispenser 100 can be integrated within a linear, pass through additive dispenser 300 as illustrated in FIG. 10. The linear, pass through additive dispenser 300 is positioned in a serial, linear flow path, positioned between a lubricant source pipe 330 and a lubricant return pipe 340. Lubricant flows into the linear, pass through additive dispenser 300 via the lubricant source pipe 330. The lubricant passes into a base manifold 316 via a lubricant source passageway 332. The lubricant source pipe 330 can be coupled to the dispenser base assembly 310 in any reasonable manner; preferably a configuration allowing ease of servicing of the linear, pass through additive dispenser 300. It is understood the lubricant source passageway 332 can be of any size and shape. The lubricant is distributed within the base manifold 316 to a plurality of hollow dispensing chamber ports 324 and a plurality of solid dispensing chamber ports 326. The lubricant applies pressure to the delivery piston 156 and delivery piston 176. The delivery piston 156 and additive 178 transfer the pressure to the additive 158 and additive 178 respectively, causing the additive 158, 178 to discharge through the porous sidewall 152, 172. The lubricant also passes through the hollow dispensing chamber port 324, continuing through the lubricant passage 160 and discharging via the flow discharge port 162 into the interior formed by a dispenser enclosure 302. The treated lubricant can exit the dispenser enclosure 302 through a lubricant return passageway 342, passing into the lubricant return pipe 340. The lubricant return pipe 340 conveys the treated lubricant back into a lubrication system.

Figure 11:
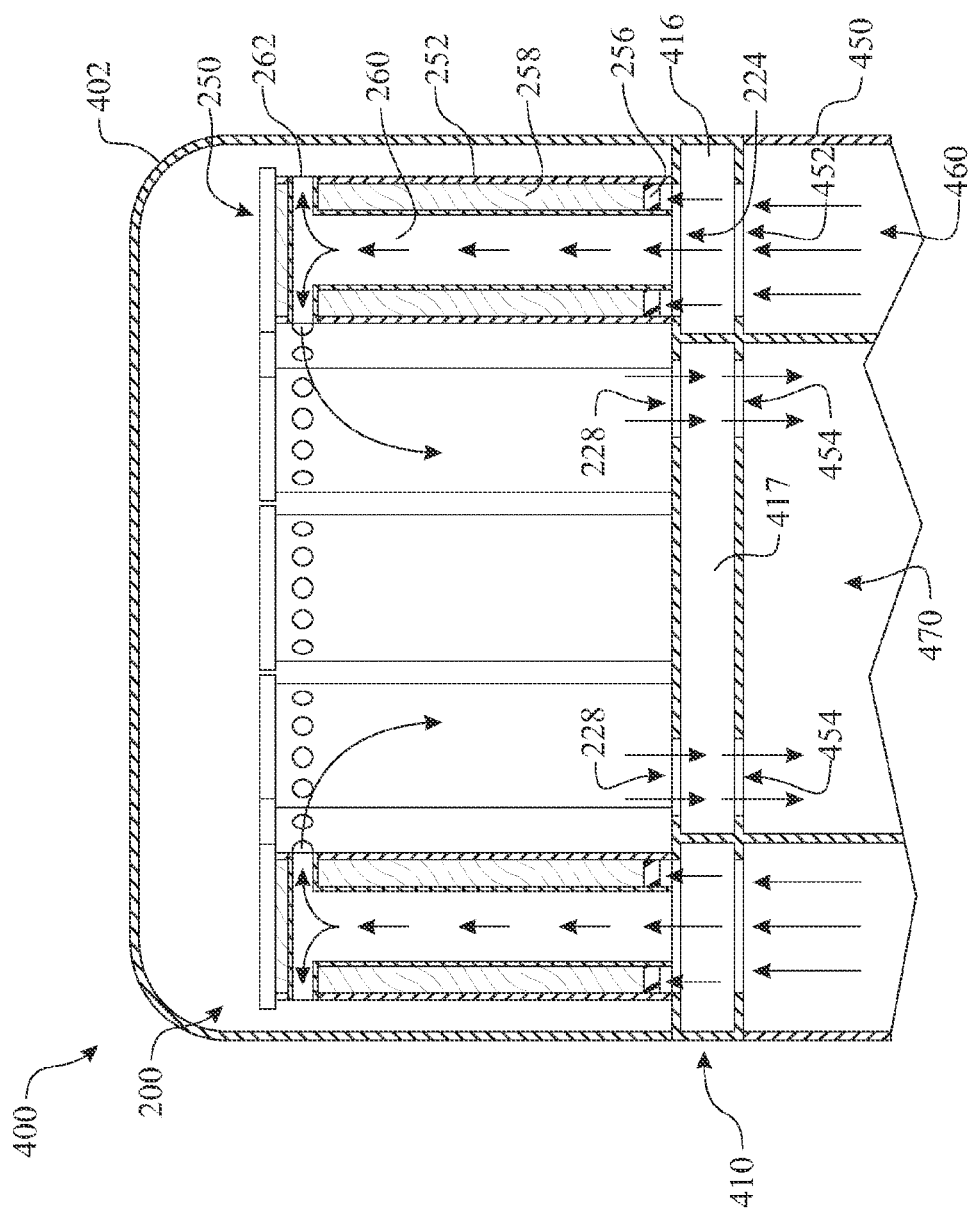
FIG. 11 presents a sectioned side view of the multi-chambered additive dispenser encased within a "U"-shaped pass through delivery apparatus.

The spiraling multi-chambered additive dispenser 200 (as shown), or similar, can be integrated within a bracket mounted additive dispenser 400 as illustrated in FIG. 11. The bracket mounted additive dispenser 400 is adapted to mount to a bracket 450. Lubricant flows into the bracket mounted additive dispenser 400 via the lubricant supply path 460 formed within the bracket assembly 450. The lubricant passes into a supply manifold 416 via a bracket supply port 452. The bracket assembly 450 can be coupled to the dispenser base assembly 410 in any reasonable manner; preferably a configuration allowing ease of servicing of the bracket mounted additive dispenser 400. It is understood the bracket supply port 452 can be of any size and shape. The lubricant is distributed within the supply manifold 416 to a plurality of hollow dispensing chamber ports 224. The lubricant applies pressure to the delivery piston 256. The delivery piston 256 transfers the pressure to the additive 258, causing the additive 258 to discharge through the porous sidewall 252. The lubricant also passes through the hollow dispensing chamber port 224, continuing through the lubricant passage 260 and discharging via the flow discharge port 262 into the interior formed by a dispenser enclosure 402. The treated lubricant can exit the dispenser enclosure 402 through a plurality of lubricant passage ports 228, passing into a discharge manifold 417. The treated lubricant continues through at least one bracket discharge port 454, into a lubricant return path 470 to return to the lubrication system. This flow creates turbulence as the lubricant exits the flow discharge port 262 and flows back across the porous sidewall 252. The discharged additive 258 mixes with the lubricant as it passes across the porous sidewall 252.

Figure 12:
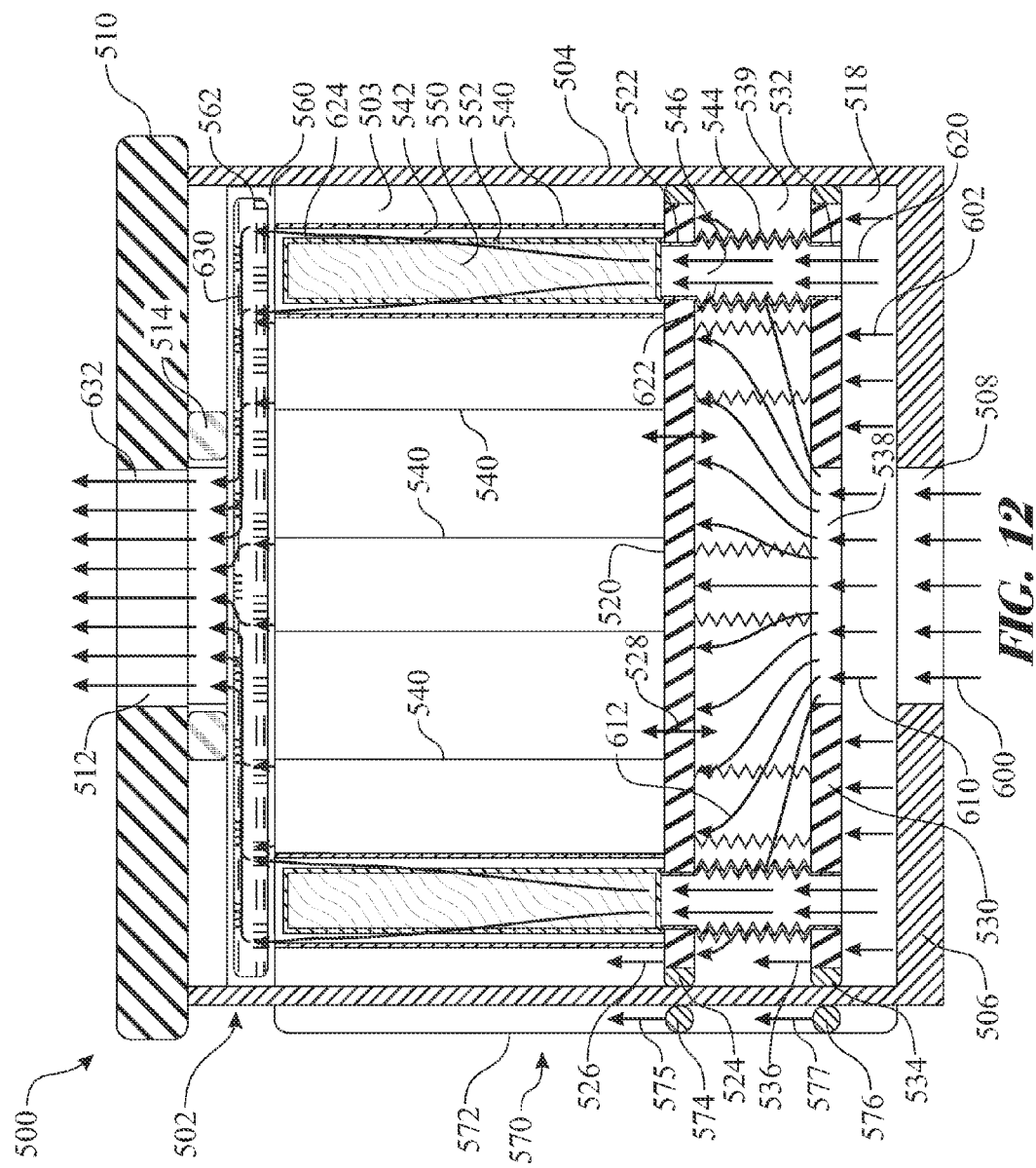
FIG. 12 presents a sectioned side view of an exemplary fluid reclamation processing assembly introducing a vibration generating system, the reclamation processing assembly being shown in an initial state.
Figure 13:
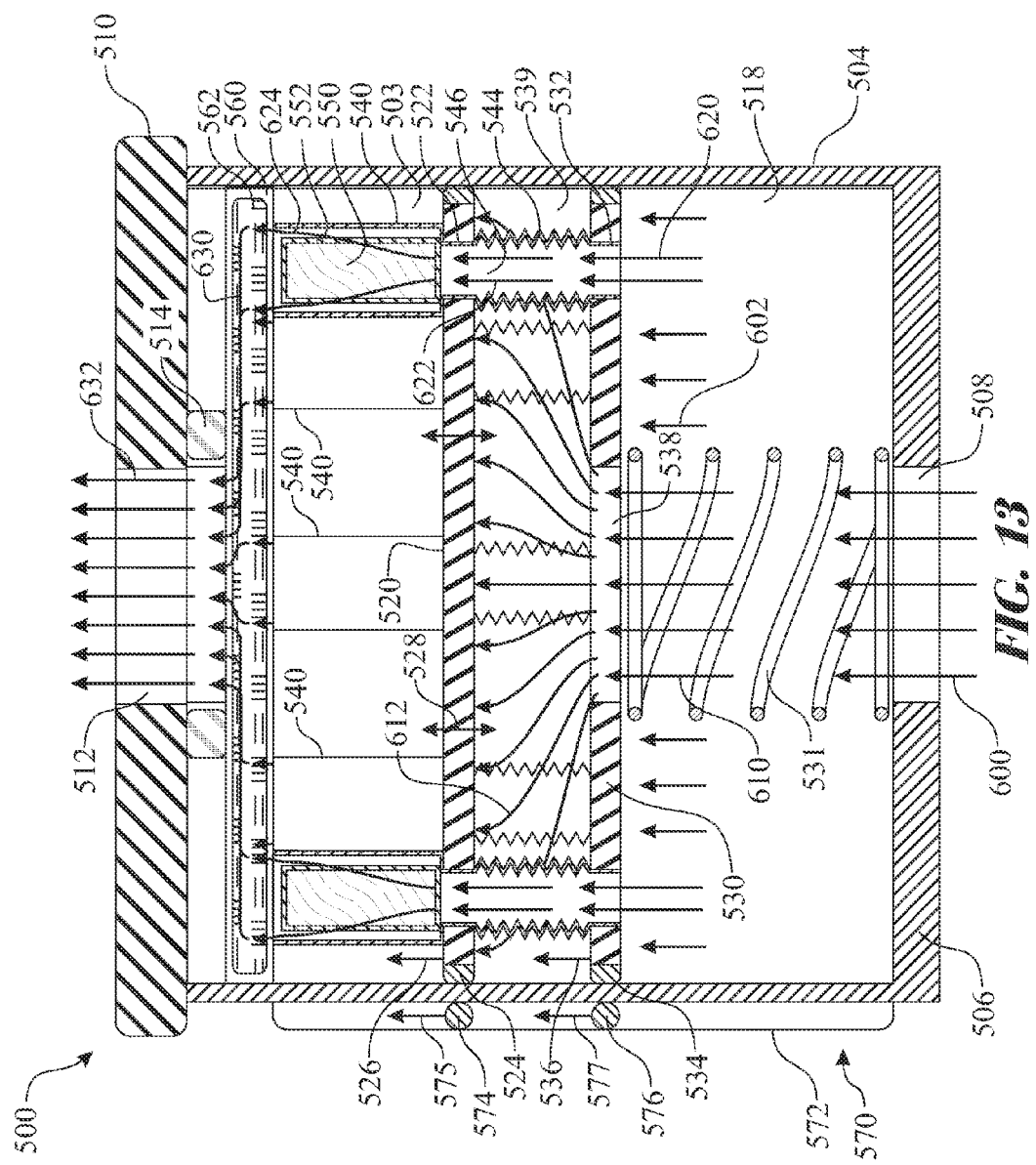
FIG. 13 presents a sectioned side view of the fluid reclamation processing assembly originally introduced in FIG. 12, the reclamation processing assembly being shown in a partially depleted state.

A fluid reclamation processing assembly 500, as illustrated in FIGS. 12 through 14, includes elements for fluid reclamation as well as elements for injection of fluid processing additives. The fluid reclamation processing assembly 500 is illustrated in an initial state in FIG. 12 and a partially depleted state in FIG. 13.

The fluid reclamation processing assembly 500 includes a fluid processing housing 502 for containing the fluid flow across the fluid processing elements. The fluid processing housing 502 defines a fluid impervious interior volume for passing a fluid therethrough. The interior volume of the fluid processing housing 502 is defined by a tubular fluid processing housing sidewall 504 contiguous about and extending axially from a peripheral edge of a fluid processing housing base member 506. A fluid processing housing cover 510 is removably attached from an exposed end of the fluid processing housing sidewall 504. A fluid processing housing supply orifice 508 is formed through the fluid processing housing base member 506 providing an inlet for spent fluid. A fluid processing housing return orifice 512 is formed through the fluid processing housing cover 510 providing an outlet for processed fluid. A fluid processing housing cover seal 514 provides a fluid seal about the fluid processing housing return orifice 512. The fluid is directed through the interior volume by a series of passageways. In addition to being processed, the fluid provides a pressure to release a fluid enhancing additive 550 from within an additive injecting chamber 540, enabling the released volume of fluid enhancing additive 550 to blend into the fluid.

The fluid reclamation processing assembly 500 includes a series of additive injecting chambers 540, each additive injecting chamber 540 having a longitudinal axis oriented parallel to the fluid flow. The series of additive injecting chambers 540 can be arranged in any suitable format. One exemplary format is an equally spaced, radial arrangement presented in the sectioned top view illustrated in FIG. 13. A volume of fluid enhancing additive 550 is retained within an interior of each respective additive injecting chamber 540. The walls of the additive injecting chamber 540 can be fabricated of either a porous material or an impervious material, wherein the design of the fluid reclamation processing assembly 500 would dictate properties of the wall material. The walls of the additive injecting chamber 540 are designed to be collapsible under pressure.

The series of additive injecting chambers 540 extends between an additive compression piston 520 located at a supply end and a return manifold 560 at a discharge end thereof. The return manifold 560 remains stationary, while the additive compression piston 520 slideably compresses the series of additive injecting chambers 540 towards the return manifold 560. In use, fluid, referenced as a pressurized fluid 612, applies a pressure to the additive compression piston 520. The pressure causes the additive compression piston 520 to compress against the supply end of each of the fluid passages 542. The compression aids in discharging particles of the fluid enhancing additive 550 from within the additive injecting chamber 540. A molded polymer wrap 524 is integrated about a peripheral edge of the additive compression piston 520 to reduce friction between the additive compression piston 520 an interior surface of the fluid processing housing sidewall 504. As a volume of the fluid enhancing additive 550 is reduced based upon use, the additive compression piston 520 continuously applies pressure to the fluid passage 542, compressing the fluid enhancing additive 550 towards the discharge end thereof. The molded polymer wrap 524 can be fabricated of a molded polymer wrap or ring. The material would generate triboelectric charging from micro vibrations induced by the varying pressure applied to the additive compression piston 520.

The fluid introduces a variety of forces into the additive injection process. The fluid, referenced as a distributed fluid pressure 602, applies a distributed force across the pressure retention and vibration control disc 530. Fluid enters the fluid reclamation processing assembly 500 through a fluid processing housing supply orifice 508; the entering fluid is referenced as a contaminated fluid supply 600. The fluid is disbursed into a reclamation direction and an activation direction. The pressure retention and vibration control disc 530 can be retained in position when the fluid pressure is low by incorporating a control disc retention biasing member 531 (shown in FIG. 13 while being omitted in FIG. 12 to ensure clarity) between a supply side of the pressure retention and vibration control disc 530 and an interior surface of the fluid processing housing base member 506. The control disc retention biasing member 531 can be any biasing element, including a coil spring, a cantilevered spring, and the like. Alternatively, the biasing function of the dispensing chamber supply diaphragm 544 can retain the pressure retention and vibration control disc 530 in a proximal distal relation with the additive compression piston 520.

The reclamation direction processes the spent fluid for reuse by the system. The activation direction utilizes the fluid to introduce pressure and vibrational energy into the system to aid in the additive injection process. A pressure retention and vibration control disc 530 is integrated into the fluid reclamation processing assembly 500 to divide the incoming fluid into the reclamation direction and the activation direction. The pressure retention and vibration control disc 530 includes a series of additive processing supply disc orifice 532 for transferring a portion of the fluid into each respective additive injecting chamber 540. The fluid can pass through a fluid passage 542 provided between the interior surface of the additive injecting chamber 540 and the volume of fluid enhancing additive 550. The volume of fluid enhancing additive 550 is contained within an additive container 552. The fluid enhancing additive 550 can be a liquid additive, a pellet additive, and the like. As the fluid passes the fluid enhancing additive 550, a portion of the fluid enhancing additive 550 dissolves into the passing fluid. The fluid can be discharged through a porous wall of the additive injecting chamber 540 or through one or more orifices provided through a discharge end wall of the additive injecting chamber 540.

The fluid can be directed to flow in accordance with at least one of:
  A) Through the fluid enhancing additive 550, diluting the additive over time;
  B) Flowing adjacent to the additive injecting chamber 540, where the fluid enhancing additive 550 would be infused into the fluid through the porous walls of the additive injecting chamber 540; or
  C) Flowing within an interior of the additive injecting chamber 540 and external to the additive container 552.

The application of a compressive force upon the fluid enhancing additive 550 aids in controlling the dispensing of the fluid enhancing additive 550 into the fluid. The compression applied to the fluid enhancing additive 550 forces particles through the porous wall of the additive container 552.

Following a second fluid flow path, the pressure retention and vibration control disc 530 provides a function of retaining fluid within a vibration inducing pressurized chamber 539 to retain pressure and control vibrational energy therein. Fluid, referenced as a pressurizing fluid flow 610, enters the vibration inducing pressurized chamber 539 through a pressure supply orifice 538. The pressure of the flowing fluid (pressurized fluid 612) is applied to a source surface of the additive compression piston 520. The variations of pressure from the pressurized fluid 612 causes the additive compression piston 520 to move in accordance with a vibratory motion 528. The additive compression piston 520 essentially acts as a diaphragm. Changes in the pressure generate a vibration, which is transferred to the fluid enhancing additive 550. The vibrational energy aids in controlling the disbursement and absorption of the fluid enhancing additive 550 into the fluid. The continuously applied pressure, vibration, and fluid flow help retain an even dissolution of the fluid enhancing additive 550 about each of the additive injecting chambers 540.

In an alternative configuration, the additive compression piston 520 is fabricated of a porous medium, wherein the fluid passes through the additive compression piston 520. A filtration material (not shown for clarity) can be included within the interior volume of the fluid processing housing 502 between the additive compression piston 520 and the return manifold 560. The porosity of the additive compression piston 520 can be designed to adjust the resulting pressure applied by the fluid.

One or more dispensing chamber supply diaphragms 544 are provided for each additive injecting chamber 540, wherein each dispensing chamber supply diaphragm 544 is assembled between the additive compression piston 520 and a pressure retention and vibration control disc 530. A supply diaphragm passage 546 of the dispensing chamber supply diaphragm 544 provides a fluid conduit for transferring fluid from the supply distribution chamber 518 into the additive injecting chamber 540. Fluid, referenced as a fluid reclamation and additive supply flow 620, enters the supply diaphragm passage 546 by passing through an additive processing supply disc orifice 532 of the pressure retention and vibration control disc 530. Fluid, referenced as a fluid reclamation and additive supply flow 622, transfers from the dispensing chamber supply diaphragm 544 into the additive injecting chamber 540 through an additive processing supply orifice 522 of the additive compression piston 520. Fluid, referenced as an additive processing flow 624, continues through the additive injecting chamber 540 absorbing particles of fluid enhancing additive 550 into solution. The fluid, referenced as a reclamation collection flow 630, passes through an end cap of the additive injecting chamber 540 and is collected within the return manifold 560. The reclamation collection flow 630 can be processed by the filtration polymer pad 562. The fluid returns to the system through the fluid processing housing return orifice 512 in accordance with a reclaimed fluid return flow 632.

In an alternative embodiment, the additive compression piston 520 can include fluid passages or be fabricated of a porous material. The fluid would pass through the additive compression piston 520, collecting within a fluid reclamation chamber 503. The fluid reclamation chamber 503 would be formed within the interior volume of the fluid processing housing 502 surrounding the series of additive injecting chambers 540. The additive injecting chambers 540 would be fabricated of a porous wall, wherein the compressed additive injecting chambers 540 force particles of the fluid enhancing additive 550 therethrough.

The dispensing chamber supply diaphragm 544 is preferably designed to include an expandable/collapsible sidewall, such as an accordion design presented in the illustration. The dispensing chamber supply diaphragm 544 can include spring like properties. Alternatively, a spring can be integrated into the dispensing chamber supply diaphragm 544. The spring or other biasing member retains a flexible distance between the additive compression piston 520 and the pressure retention and vibration control disc 530.

As the fluid exists each of the additive injecting chambers 540, the fluid is collected by a return manifold 560. The fluid can be processed by a filtration polymer pad 562 located within the filtration polymer pad 562. The reclaimed fluid is collected within the return manifold 560 and is returned to the system for use through the fluid processing housing return orifice 512. The returning fluid is referenced as a reclaimed fluid return flow 632.

A status monitoring system 570 can be integrated into the fluid reclamation processing assembly 500 to provide feedback to a service person to identify the status of at least one of the pressure retention and vibration control disc 530 and the additive compression piston 520. The status monitoring system 570 includes a system control disc position indicator 576 retained within an indicator chamber 572. The indicator chamber 572 would be fabricated of a clear or translucent material, enabling visual inspection of the system control disc position indicator 576. The system control disc position indicator 576 would be magnetically attracted to an element provided on the pressure retention and vibration control disc 530. In the exemplary embodiment, the disc edge material 534 can include a ferric material. The system control disc position indicator 576 would be a bearing fabricated of a magnetic material, wherein the system control disc position indicator 576 maintains a position respective to the disc edge material 534. The spherical shape minimizes friction, thus optimizing the accuracy of the indicator. The system control disc position indicator 576 would move in accordance with a system control disc position indicator motion 577 in conjunction with the pressure retention motion 536 of the pressure retention and vibration control disc 530. Similarly, a piston position indicator 574 is utilized to identify a position of the additive compression piston 520. The piston position indicator 574 would be magnetically attracted to a feature integrated into the additive compression piston 520, such as the molded polymer wrap 524. The piston position indicator 574 would move in accordance with a piston position indicator motion 575 in conjunction with the compressive motion 526 of the additive compression piston 520. The indicator chamber 572 can include a reference indicator for improving the conveyance of the positions of the additive compression piston 520 and pressure retention and vibration control disc 530.

It is understood that the reclamation elements including the pressure retention and vibration control disc 530, the return manifold 560 and all elements therebetween can be integrated into a replaceable cartridge. The replaceable cartridge would be replaced by removing the fluid processing housing cover 510 from the fluid processing housing sidewall 504, removing the spent cartridge, inserting a fresh, charged cartridge, and replacing the fluid processing housing cover 510 onto the fluid processing housing sidewall 504.

A fluid reclamation processing assembly 700 presents an alternative embodiment illustrated in FIG. 15. The fluid reclamation processing assembly 700 is a variation of the fluid reclamation processing assembly 500, wherein the fluid reclamation processing assembly 700 integrates the functional concepts of the fluid reclamation processing assembly 500 utilizing a variation in implementation. Like features of the fluid reclamation processing assembly 700 and the fluid reclamation processing assembly 500 are numbered the same except preceded by the numeral '7'.

A series of additive injecting chambers 740 are arranged within a fluid processing housing 702. Sidewalls of the additive injecting chamber 740 are fabricated of a porous material. A volume of additive 750 is contained within each additive injecting chamber 740. An additive injecting piston 746 is integrated into each additive injecting chamber 740. The additive injecting piston 746 applies pressure to a supply end of the additive 750. The pressure causes particles of the additive 750 to release through the porous sidewall of the additive injecting chamber 740. The released particles enter into solution with the fluid.

Fluid enters the fluid reclamation processing assembly 700 through a fluid processing housing supply orifice 708 provided through a fluid processing housing base member 706 of a fluid processing housing 702. The fluid is initially apportions into several flow paths. A first flow path passes a source fluid flow 800 through an additive processing supply disc orifice 732 of a dispensing chamber supply diaphragm 744 for reclamation. A second flow path transfers a diverted source pressure generating fluid flow 802 for use as a vibration generator. The diverted source pressure generating fluid flow 802 flows through any of a series of pressure supply orifices 738 (each orifice 738 extending through a respective pressure nozzle 737) directing the fluid into a vibration inducing chamber 718. The entrapped fluid generates a vibration generating fluid pressure 812 against a supply side of a reclamation flow manifold 780. The slight variations in pressure of the fluid generate a vibration 728. The vibration 728 is transferred throughout the elements of the additive injection portion of the fluid reclamation processing assembly 700 increasing the efficiency of injection of the additive 750 into the fluid.

The source fluid flow 800 is apportioned into several flow paths. One flow path passes a reclamation transition fluid flow 810 through a reclamation supply orifice 782 and continues into a reclamation chamber 703 within the fluid processing housing 702. The additive compression piston manifold 720 can be fabricated of a porous material enabling passage of the reclamation transition fluid flow 810 therethrough. The porosity of the additive compression piston manifold 720 can be sized to provide filtration of the reclamation transition fluid flow 810 for removal of contaminants. Alternatively, the additive compression piston manifold 720 can include at least one orifice providing a passageway for transfer of the reclamation transition fluid flow 810 into the reclamation chamber 703. A filtration material (not shown) can be disposed within the reclamation chamber 703 for removal of contaminants from the fluid. A second flow path passes an additive pressure generating fluid flow 822 through a series of piston pressure supply conduits 784, supplying a volume of fluid (forming a fluid generated piston pressure 824) into a, additive processing supply orifice 722. The fluid generated piston pressure 824 applies a compression force upon an additive injecting piston 746 located at a supply end of the additive 750. The compression force drives particles of the additive 750 through the porous wall of the additive injecting chamber 740 for absorption into the reclamation fluid flow 840.

The fluid can return to the system passing through an optional filtration polymer pad 762 contained within a return manifold 760. The filtration polymer pad 762 provides a final filtration processing to the fluid. The processed fluid is returned to the system for use by a reclaimed fluid return flow 832 passing through a fluid processing housing return orifice 712 of a fluid processing housing cover 710.

The dispensing chamber supply diaphragm 744 can include an accordion sidewall. The dispensing chamber supply diaphragm 744 provides a spring function between the pressure retention and vibration control disc 730 and the reclamation flow manifold 780. The fluid within the vibration inducing chamber 718 provides a dampening function between the pressure retention and vibration control disc 730 and the reclamation flow manifold 780. The spring rate of the dispensing chamber supply diaphragm 744 and dampening co-efficient of the vibration inducing chamber 718 can be tailored to optimize the vibrational energy generated by the fluid flow.

A status monitoring system 770 can be integrated into the fluid reclamation processing assembly 700 to identify the status of the pressure retention and vibration control disc 730. The status monitoring system 770 includes like elements of the status monitoring system 570, which function and are numbered the same except preceded by the numeral '7'. The system control disc position indicator 776 and a position indicator edge 734 of the pressure retention and vibration control disc 730 would be magnetically attracted to one another.

It is understood that features of the fluid reclamation processing assembly 700 and fluid reclamation processing assembly 500 can be incorporated within either embodiment to modify or enhance the reclamation process.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A lubricant additive dispenser, the dispenser comprising:
a fluid processing housing having a supply base member, a tubular housing sidewall extending axially from a peripheral edge of the supply base member, and a housing cover sealing an exposed end of the tubular housing sidewall, the fluid processing housing defining an interior volume;
a fluid processing housing supply orifice passing through the fluid processing housing;
a fluid processing housing return orifice passing through the fluid processing housing;
an additive compression piston slideably assembled within the interior volume of the fluid processing housing, the additive compression piston defining a fluid processing side and a supply side;
a series of additive injecting chambers extending from the additive compression piston fluid processing side towards a housing cover;
a fluid enhancing additive contained within each of the series of additive injecting chambers;
a vibration inducing pressurized chamber having one side defined by the additive compression piston supply side; and
a fluid pathway between the fluid processing housing supply orifice and the fluid processing housing return orifice, wherein the fluid pathway directs fluid to apply a pressure against the additive compression piston supply side resulting in a compressive force applied by the additive compression piston fluid processing side upon each of the series of additive injecting chambers to inject a volume of the fluid enhancing additive into a fluid.

2. A lubricant additive dispenser as recited in claim 1, the additive injecting chambers further comprising a porous sidewall.

3. A lubricant additive dispenser as recited in claim 1, the additive compression piston is fabricated of a porous material.

4. A lubricant additive dispenser as recited in claim 1, further comprising a filtration polymer pad located along a fluid flow path routed between the series of additive injecting chambers and the fluid processing housing return orifice.

5. A lubricant additive dispenser as recited in claim 1, the additive compression piston further comprising a molded polymer wrap extending about a peripheral edge thereof.

6. A lubricant additive dispenser as recited in claim 1, further comprising an additive compression piston indicator comprising:
an indicator chamber having at least a clear segment extending along a longitudinal axis assembled to an exterior surface of the fluid processing housing;
a piston position indicator moveably retained within the indicator chamber; and
an indicator feature assembled to the additive compression piston at a location proximate the indicator chamber,
wherein the piston position indicator and the indicator feature are magnetically attracted to one another such that the piston position indicator moves within the indicator chamber in conjunction with movement of the additive compression piston.

7. A lubricant additive dispenser as recited in claim 6, wherein the piston position indicator is spherically shaped.

8. A lubricant additive dispenser, the dispenser comprising:
a fluid processing housing having a supply base member, a tubular housing sidewall extending axially from a peripheral edge of the supply base member, and a housing cover sealing an exposed end of the tubular housing sidewall, the fluid processing housing defining an interior volume;
a fluid processing housing supply orifice passing through the fluid processing housing;
a fluid processing housing return orifice passing through the fluid processing housing;
an additive compression piston slideably assembled within the interior volume of the fluid processing housing, the additive compression piston defining a fluid processing side and a supply side;
a series of additive injecting chambers extending from the additive compression piston fluid processing side towards a housing cover;
a fluid enhancing additive contained within each of the series of additive injecting chambers;
a pressure retention and vibration control disc assembled within the interior volume of the fluid processing housing, the pressure retention and vibration control disc located facing the additive compression piston supply side;
a vibration inducing pressurized chamber having one side defined by the additive compression piston supply side and the opposite side defined by the pressure retention and vibration control disc; and
a fluid pathway between the fluid processing housing supply orifice and the fluid processing housing return orifice, wherein the fluid pathway directs fluid to apply a pressure against the additive compression piston supply side resulting in a compressive force applied by the additive compression piston fluid processing side upon each of the series of additive injecting chambers to inject a volume of the fluid enhancing additive into a fluid.

9. A lubricant additive dispenser as recited in claim 8, the additive injecting chambers further comprising a porous sidewall.

10. A lubricant additive dispenser as recited in claim 8, the additive compression piston is fabricated of a porous material.

11. A lubricant additive dispenser as recited in claim 8, further comprising a member retaining a generally consistent distance between the additive compression piston and the pressure retention and vibration control disc throughout a lifespan of movement of the additive compression piston and the pressure retention and vibration control disc.

12. A lubricant additive dispenser as recited in claim 8, the additive compression piston further comprising a molded polymer wrap extending about a peripheral edge thereof.

13. A lubricant additive dispenser as recited in claim 8, further comprising an additive compression piston indicator comprising:
- an indicator chamber having at least a clear segment extending along a longitudinal axis assembled to an exterior surface of the fluid processing housing;
- a piston position indicator moveably retained within the indicator chamber; and
- an indicator feature assembled to the additive compression piston at a location proximate the indicator chamber,
- wherein the piston position indicator and the indicator feature are magnetically attracted to one another such that the piston position indicator moves within the indicator chamber in conjunction with movement of the additive compression piston.

14. A lubricant additive dispenser as recited in claim 13, wherein the piston position indicator is spherically shaped.

* * * * *